United States Patent
Rebien et al.

(10) Patent No.: US 12,277,821 B2
(45) Date of Patent: Apr. 15, 2025

(54) ACCESS CONTROL SYSTEM AND METHOD TO DISTINGUISH BETWEEN TAILGATE AND PIGGYBACK

(71) Applicant: MOTOROLA SOLUTIONS, INC., Chicago, IL (US)

(72) Inventors: Sven Rebien, Victoria (CA); Pietro Russo, Melrose, MA (US); Peter L. Venetianer, McLean, VA (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 587 days.

(21) Appl. No.: 17/645,410

(22) Filed: Dec. 21, 2021

(65) Prior Publication Data

US 2023/0196860 A1    Jun. 22, 2023

(51) Int. Cl.
  *G07C 9/25*  (2020.01)
  *G06V 20/52*  (2022.01)
  *G06V 40/20*  (2022.01)
  *G07C 9/21*  (2020.01)

(52) U.S. Cl.
  CPC ............ *G07C 9/253* (2020.01); *G06V 20/52* (2022.01); *G06V 40/20* (2022.01); *G07C 9/21* (2020.01)

(58) Field of Classification Search
  CPC . G07C 9/253; G07C 9/21; G07C 9/10; G07C 9/257; G07C 9/37; G06V 20/52; G06V 40/20; G06V 40/103; G06V 40/172
  See application file for complete search history.

(56) References Cited

U.S. PATENT DOCUMENTS

| | | | |
|---|---|---|---|
| 6,504,470 B2 * | 1/2003 | Puchek | G07C 9/23 340/5.53 |
| 10,235,854 B2 | 3/2019 | Trani | |
| 2011/0107216 A1 * | 5/2011 | Bi | G06F 3/0481 715/863 |
| 2012/0169880 A1 | 7/2012 | Williamson | |
| 2018/0102005 A1 * | 4/2018 | Esposito | G06F 3/017 |
| 2019/0355193 A1 | 11/2019 | Kirsch et al. | |
| 2020/0005319 A1 | 1/2020 | Scarborough et al. | |
| 2021/0209877 A1 | 7/2021 | Neill et al. | |
| 2022/0083049 A1 * | 3/2022 | Kawai | G05D 1/0016 |
| 2024/0169779 A1 * | 5/2024 | Sakayama | G07C 9/15 |

* cited by examiner

*Primary Examiner* — John B Strege
(74) *Attorney, Agent, or Firm* — Michael Best & Friedrich LLP

(57) ABSTRACT

Access control system and method to distinguish between tailgate and piggyback. The method includes receiving, from a camera positioned at an access point, one or more images of a first person at the access point and determining based on credential information whether the first person is authorized to enter through the access point. In response to determining that the first person is authorized to enter through the access point, the method includes determining, based on a consent-to-follow gesture of the first person detected in the one or more images, a number of guests of the first person requested to enter through the access point. The method also includes determining, based on the one or more images, a number of persons entering through the access point and generating an alert indicating unauthorized entry when the number of persons is greater than the number of guests.

13 Claims, 4 Drawing Sheets

ACCESS CONTROL SYSTEM AND METHOD
TO DISTINGUISH BETWEEN TAILGATE
AND PIGGYBACK

BACKGROUND OF THE INVENTION

Access points are used in buildings to provide controlled or automatic access to persons entering and exiting through a building or through suites in the building. Access through the access points may be controlled, for example, using active and/or passive access control. An active system typically requires visual monitoring of the access point by an individual either on site or at a remote location. Passive access control does not require human monitoring and may utilize, for example, a key card or sensor. In one example, one or more infrared sensors are provided above or near the access point.

BRIEF DESCRIPTION OF THE SEVERAL
VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
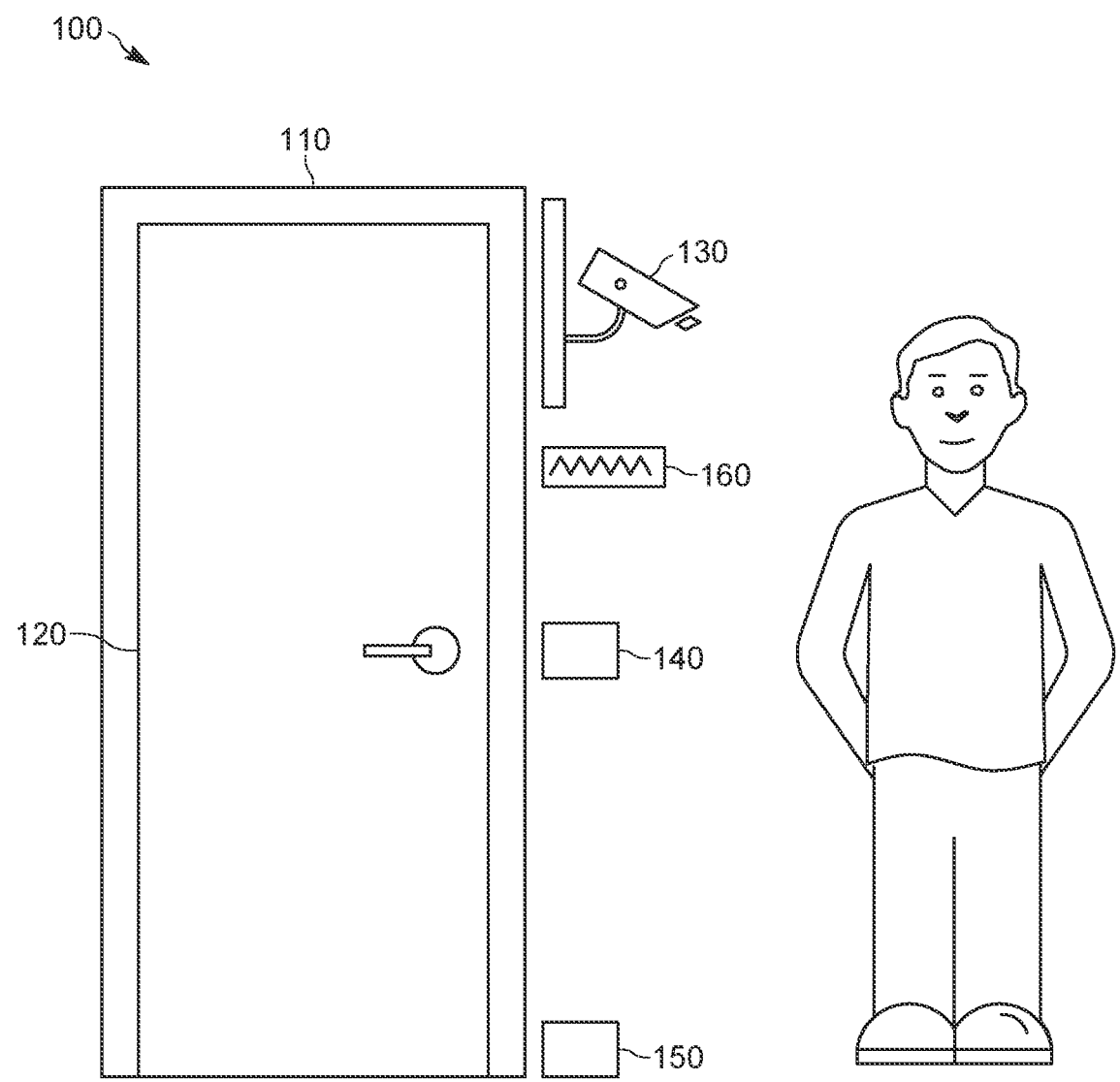
FIG. 1 illustrates an access point in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE
INVENTION

Many access points (for example, at entrance of a facility, building, room, public transportation system, and the like) are restricted to authorized persons and guests of authorized persons only. For example, entrance to residential buildings, office buildings or campuses, public facilities (for example, courtrooms, airports), and the like are often limited to authorized persons and their guests. At actively monitored restricted access points, an authorized person may communicate with the individual monitoring the access point to let guests of the authorized person through the access point and prevent unauthorized persons from entering through the access point.

However, active monitoring is not cost effective and creates friction when entering through the access point. Many facilities are now transitioning to frictionless passive monitoring systems. At passively monitored access points, it is often difficult to differentiate between guests (for example, piggyback) and unauthorized persons (for example, tailgate) entering before or after the authorized person through the access point.

Accordingly, there is a need for an access control system and corresponding method to distinguish between tailgate and piggyback.

One embodiment provides an access control system including a camera configured to be positioned at an access point and an electronic processor coupled to the camera. The electronic processor is configured to receive, from the camera, one or more images of a first person at the access point and determine based on credential information whether the first person is authorized to enter through the access point. In response to determining that the first person is authorized to enter through the access point, the electronic processor is configured to determine, based on a consent-to-follow gesture of the first person detected in the one or more images, a number of guests of the first person requested to enter through the access point. The electronic processor is further configured to determine, based on the one or more images, a number of persons entering through the access point and generate an alert indicating unauthorized entry when the number of persons is greater than the number of guests.

Another embodiment provides method for providing access control. The method includes receiving, from a camera positioned at an access point, one or more images of a first person at the access point and determining, using an electronic processor, based on credential information whether the first person is authorized to enter through the access point. In response to determining that the first person is authorized to enter through the access point, the method includes determining, using the electronic processor based on a consent-to-follow gesture of the first person detected in the one or more images, a number of guests of the first person requested to enter through the access point. The method also includes determining, using the electronic processor based on the one or more images, a number of persons entering through the access point and generating, using the electronic processor, an alert indicating unauthorized entry when the number of persons is greater than the number of guests.

Another embodiment provides an access control system including a camera configured to be positioned at an access point and an electronic processor coupled to the camera. The electronic processor is configured to receive, from the camera, one or more images of a first person at the access point and determine based on credential information whether the first person is authorized to enter through the access point. In response to determining that the first person is authorized to enter through the access point, the electronic processor is configured to detect, based on the one or more images, one or more persons between the first person and a barrier of the access point, detect a consent gesture of the first person in the one or more images, and control the barrier to open the access point when the consent gesture is detected.

FIG. 1 illustrates an example access point 100 that includes an entryway 110 and a barrier 120 that controls physical access through the entryway 110. The access point 100 also includes a camera 130, an access control sensor 140, an actuator 150, and a feedback mechanism 160. The access point 100 may be located in a building, for example, an office building, a residential building, an airport terminal, or other building. In the example illustrated, the barrier 120 is a manually operated door. In some implementations, the barrier 120 may include automatically opening and closing doors, doors that provide handicap access, turnstiles, gates, or movable barricade. In the example illustrated in FIG. 1, the camera 130 includes, for example, a video camera. The video camera is, for example, a two-dimensional video camera, a three-dimensional video camera, a time-of-flight camera, a red-green-blue (RGB) camera, and/or the like. In some embodiments, the camera 130 is configured to capture still or moving images of persons within the vicinity of the entryway 110.

The access control sensor 140 is, for example, an RFID sensor, a biometric sensor, a Bluetooth® device, and the like that is used to determine the credential information of a person entering through the entryway 110. The actuator 150 is, for example, a motor or a solenoid to actuate a lock of the barrier 120 or to actuate (move) the barrier 120 itself. The actuator 150 actuates the lock or barrier 120 based on a signal or information from the camera 130 (for example, based on information from the camera 130 processed by an electronic processor and as commanded by the electronic processor). Additional sensors may also be used to determine whether a person has accessed the building through the access point 100 when the actuator 150 actuates the access and/or the number of persons that accessed or are attempting to access the facility through the access point 100 when the actuator 150 actuates the access.

The feedback mechanism 160 may include an audio or visual feedback, for example, a speaker, a display, a light emitting diode (LED) indicator, and the like to provide feedback to the person accessing the access point 100. In some implementations, feedback to a person accessing or monitoring the access point 100 is provided in a more advanced manner. In some instance, feedback is provided via a notification service that generates a notification to one or more remote devices, for example, a device of a security entity or agency handling security of the access point 100, a device (for example, a smartphone) of an authorized person entering through the access point 100, and the like. The feedback mechanism 160 may be controlled to provide several indications based on the status of the access point 100 and the credentials of the person entering through the access point 100. FIG. 1 illustrates only one example embodiment of the access point 100. The access point 100 may include more or fewer components and may perform additional functions other than those described herein.

Figure 2:
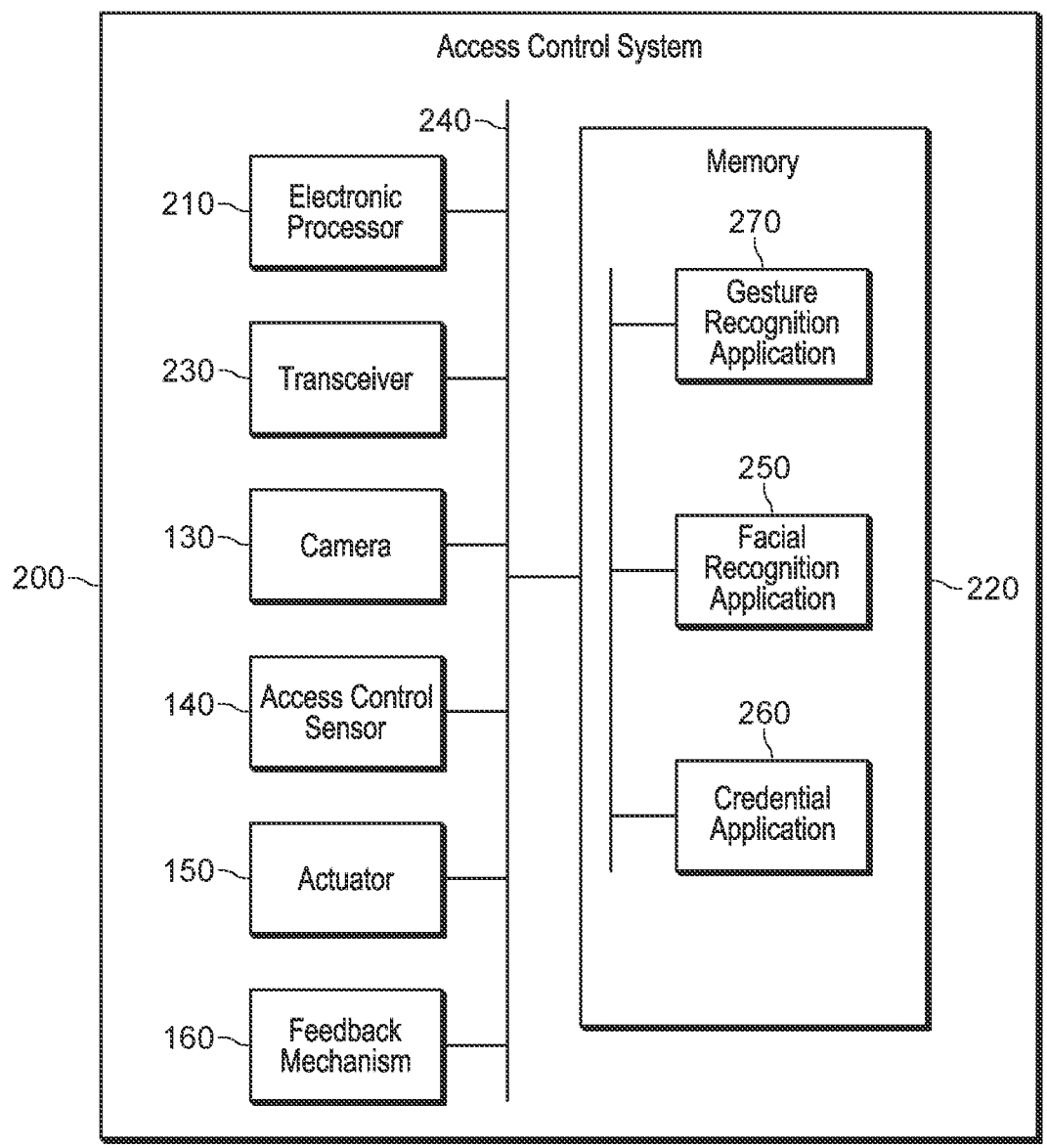
FIG. 2 is a block diagram of an access control system of the access point of FIG. 1 in accordance with some embodiments.

FIG. 2 is a block diagram of an example access control system 200 for the access point 100. The access control system 200 includes the camera 130, the access control sensor 140, the actuator 150, the feedback mechanism 160, an electronic processor 210, a memory 220, and a transceiver 230. The camera 130, the access control sensor 140, the actuator 150, the feedback mechanism 160, the electronic processor 210, the memory 220, and the transceiver 230 communicate over one or more control and/or data buses (for example, a communication bus 240). FIG. 2 illustrates only one example embodiment of the access control system 200. The access control system 200 may include more or fewer components and may perform additional functions other than those described herein.

In some embodiments, the electronic processor 210 is implemented as a microprocessor with separate memory, such as the memory 220. In other embodiments, the electronic processor 210 may be implemented as a microcontroller (with memory 220 on the same chip). In other embodiments, the electronic processor 210 may be implemented using multiple processors. In addition, the electronic processor 210 may be implemented partially or entirely as, for example, a field programmable gate array (FPGA), an applications-specific integrated circuit (ASIC), and the like and the memory 220 may not be needed or be modified accordingly. In the example illustrated, the memory 220 includes non-transitory, computer-readable memory that stores instructions that are received and executed by the electronic processor 210 to carry out the functionality of the access control system 200 described herein. The memory 220 may include, for example, a program storage area and a data storage area. The program storage area and the data storage area may include combinations of different types of memory, such as read-only memory, and random-access memory. In some embodiments, the access control system 200 may include one electronic processor 210, and/or plurality of electronic processors 210, for example, in a cluster arrangement, one or more of which may be executing none, all, or a portion of the applications of the access control system 200 described below, sequentially or in parallel across the one or more electronic processors 210. The one or more electronic processors 210 comprising the access control system 200 may be geographically co-located or may be geographically separated and interconnected via electrical and/or optical interconnects. One or more proxy servers or load balancing servers may control which one or more electronic processors 210 perform any part or all of the applications provided below.

The transceiver 230 enables wired and/or wireless communication between the access control system 200 and a remote server or other devices (for example, a device of a security entity, a device of an authorized person, and the like). In some embodiments, the transceiver 230 may comprise separate transmitting and receiving components.

In the example illustrated, the memory 220 stores several applications that are executed by the electronic processor 210. In the example illustrated, the memory 220 includes a facial recognition application 250, a credential application 260, and gesture recognition application 270. The facial recognition application 250 is executed to recognize an identity of a person based on the facial features of the person captured by the camera 130 or the access control sensor 140. The credential application 260 is executed to determine the credential information of a person attempting to access the facility through the access point 100. The gesture recognition application 270 is executed to recognize and analyze a gesture performed by an authorized person attempting to access the facility through the access point 100.

Figure 3:
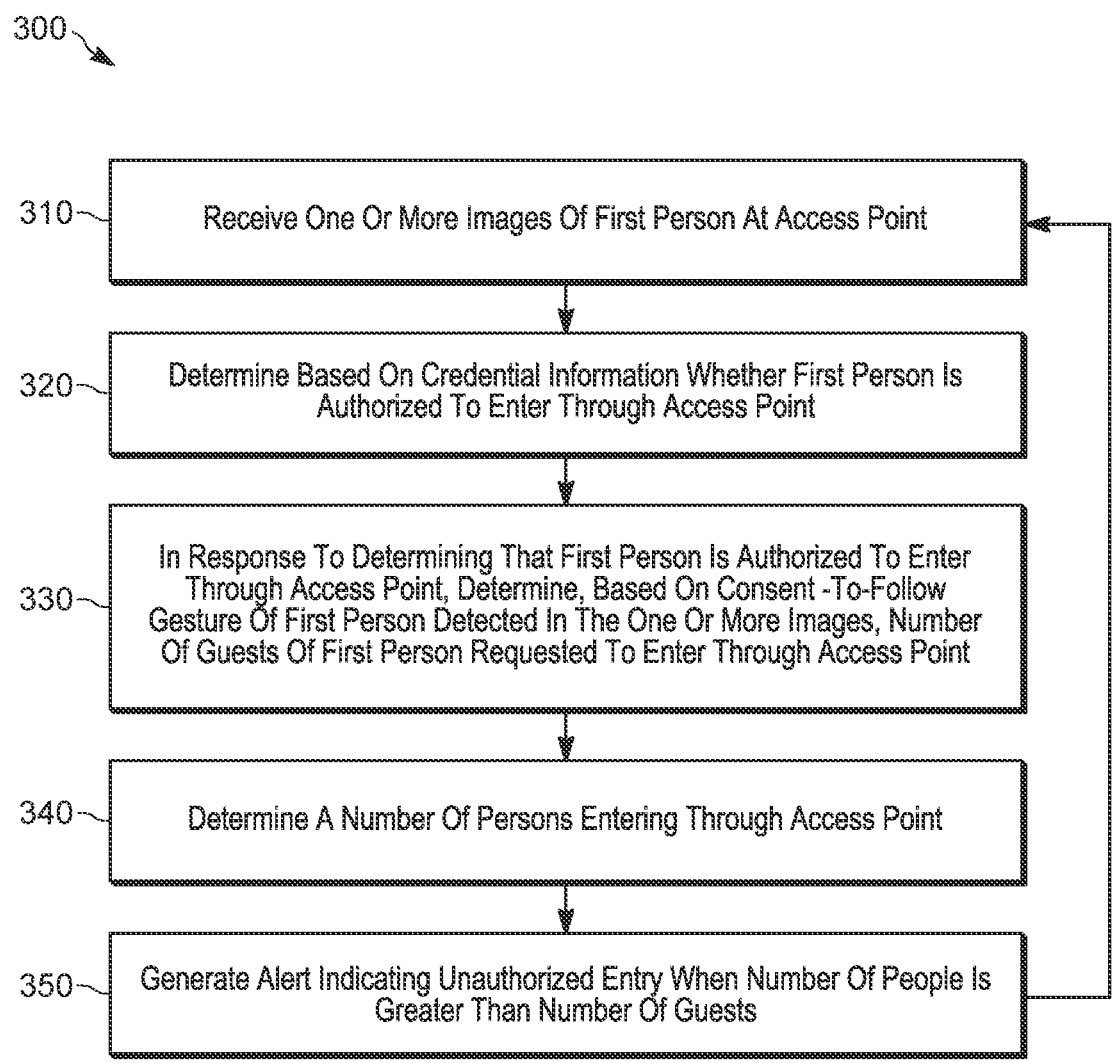
FIG. 3 is a flowchart of a method for providing access control through the access point of FIG. 1 in accordance with some embodiments.

When an authorized person opens the barrier 120 of the access point 100 one or more persons may attempt to enter through the access point 100 after the authorized person. As discussed above, it is often difficult to determine whether the one or more persons are guests (what is referred to as a "piggyback") of the authorized persons or whether the one or more persons are attempting to gain unauthorized access (what is referred to as a "tailgate"). FIG. 3 is a flowchart of an example method 300 for providing access control through the access point 100 and to differentiate between a piggyback and a tailgate. In the example shown, the method 300 includes receiving, from the camera 130, one or more images of a first person at the access point 100 (at block 310). In some embodiments, the camera 130 continually captures images in the vicinity of the access point 100. The camera 130 is, for example, an image and/or video camera that captures one or more images and/or video (for example, moving images with audio) of the point of view of the camera 130. The camera 130 captures one or images of actions performed by a first person trying to access the facility through the access point 100. The camera 130 detects the actions performed by the person after entering the field of view of the camera 130.

The method 300 also includes determining, using the electronic processor 210 and based on credential information, whether the first person is authorized to enter through the access point 100 (at block 320). In some examples, the access control sensor 140 is configured to receive the credential information from the first person. For example, the access control sensor 140 is a radio frequency identity (RFID) sensor and receives credential information from a key card of the first person including an RFID tag. The access control sensor 140 may include a biometric sensor configured to capture biometric information of the first person. For example, the access control sensor 140 scans a fingerprint, a retina, or the like of the first person. The electronic processor 210 executes the credential application 260 to determine the credential information based on the biometric information of the first person. In some implementations, the credential information may be determined based on performing facial recognition analysis on the one or more images captured by the camera 130. In one example, the electronic processor 210 executes the facial recognition application 250 on the one or more images to determine an identity of the first person. The electronic processor 210 executes the credential application 260 to determine the credential information based on the information obtained from the camera 130 and/or the access control sensor 140. The credential information may include, for example, an identity of the first person and permissions of the first person, for example, whether the first person is permitted to access the facility through the access point 100. The memory 220 may store a database storing credential information corresponding with whether the person having the credential information is authorized to enter through the entryway 110.

In response to determining that the first person is authorized to enter through the access point 100, the method 300 includes determining, using the electronic processor 210 and based on a consent-to-follow gesture of the first person detected in the one or more images, a number of guests of the first person requested to enter through the access point 100 (at block 330). The electronic processor 210 executes the gesture recognition application 270 to detect a consent-to-follow gesture in the one or more images. In one example, the consent-to follow gesture is a raised hand of the first person indicating a number of guests with fingers of the raised hand. In some embodiments, different gestures, for example, waving of the hand, nodding of the head, removing a hat or jacket, and the like are used to indicate consent and the number of guests. In some examples, the electronic processor 210 provides, using the feedback mechanism 160, a first feedback when the consent-to-follow gesture is detected. In some embodiments, the electronic processor 210 also provides, using the feedback mechanism 160, a second feedback indicating the number of guests determined based on the consent-to-follow gesture. For example, the electronic processor 210 plays a sound over the speaker, activates one or more LED indicators, displays text on a display to provide the first feedback and/or the second feedback to the first person. When no guests are accompanying the first person, the first person may not provide a gesture or may provide a closed hand or other gesture indicating no guests.

The method 300 also includes determining, using the electronic processor 210 and based on the one or more images, a number of persons entering through the access point 100 (at block 340). In one example, the electronic processor 210 executes the facial recognition application 250 to analyze the one or more images and determine the number of persons entering through the access point 100. The electronic processor 210 may execute a different application to analyze the one or more images and determine the number of persons. In some embodiments, the electronic processor 210 uses a different sensor to determine the number of persons entering through the access point 100.

The method 300 includes generating, using the electronic processor 210, an alert indicating unauthorized entry when the number of persons is greater than the number of guests (at block 350). The electronic processor 210 determines whether the number of persons is greater than the number of guests. When the number of persons is greater than the number of guests, the electronic processor 210 determines that a tailgate has occurred. When the number of persons is equal to or less than the number of guests, the electronic processor 210 determines that a piggyback has occurred. The alert may be generated using the feedback mechanism 160. For example, the electronic processor 210 may play an alarm over the speaker or activate a red light. In some embodiments, the alert is transmitted to a remote device, for example, a device of a security entity in charge of security of the facility, a device of the first person, and the like. In some situations, the first person enters through the access point 100 along with the guest of the first person. In these situations, determining that the number of persons is greater than the number of guests includes determining that the number of persons excluding the first person is greater than the number of guests or determining that the number of persons is greater than the number of guests and the first person. In some embodiments, the alert is generated when the number of persons (excluding the first person) is not equal the number of guests (for example, the number of persons is higher or lower than the number of guests).

In some embodiments, the method 300 includes controlling the barrier 120 in response to determining whether the number of persons is greater than the number of guests. For example, the electronic processor 210 controls the barrier 120 to open the access point 100 when the number of persons is less than or equal to the number of guests. The electronic processor 210 controls the actuator 150 to unlock or open the barrier 120. The electronic processor 210 keeps the barrier 120 locked or closed when the number of persons is greater than the number of guests. The electronic processor 210 controls the actuator 150 to keep the barrier 120 locked or closed. In some embodiments, an additional alert may be generated when the first person does not enter within a predetermined time after the guests of the first person entered through the access point 100. In other embodiments, the electronic processor 210 may unlock or open the barrier 120 for every person or guest in front of the first person and locks or closes the barrier 120 once the first person enters. In these embodiments, the first person entering provides a cut-off for determining the number of guests of the first person.

In some embodiments, the method 300 also accounts for a number of allowed guests for each authorized person. For example, the memory 220 may store a database including a number of allowed guests for each authorized person or for each class of authorized persons. The electronic processor 210 determines the number of allowed guests for the first person, for example, using the database in the memory 220.

The electronic processor 210 determines whether the number of guests is greater than the number of allowed guests. The electronic processor 210 generates a second alert indicating excess guests when the number of guests is greater than the number of allowed guests. As discussed above, the second alert may be generated using the feedback mechanism 160. For example, the electronic processor 210 may play an alarm over the speaker or activate a red light. In some embodiments, the second alert is transmitted to a remote device, for example, a device of a security entity in charge of security of the facility, a device of the first person, and the like. In addition to providing the second alert, the electronic processor 210 may additionally lock or close the barrier 120 when the number of guests is greater than the number of allowed guests. The electronic processor 210 therefore ensures conformity with the guests policy of the facility.

Figure 4:
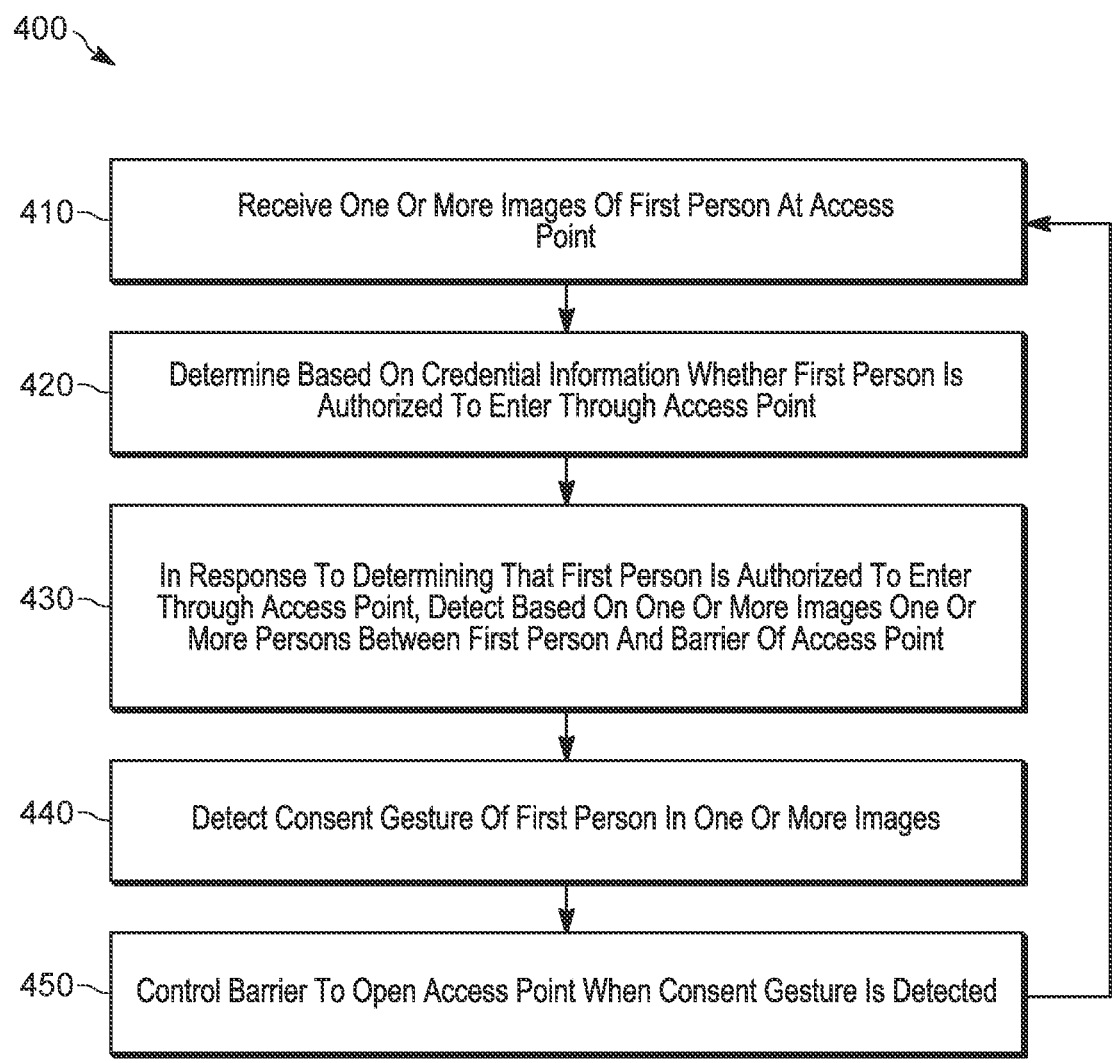
FIG. 4 is a flowchart of a method for providing access control through the access point of FIG. 1 in accordance with some embodiments.

FIG. 4 is a flowchart of an example method 400 for providing access control through the access point 100. The method 400 is similar in a number of aspects to method 300 described above. The method 400 includes receiving, from the camera 130, one or more images of a first person at the access point 100 (at block 410). In some embodiments, the camera 130 continually captures images in the vicinity of the access point 100. In other embodiments, the camera 130 only captures images when an object is detected within the vicinity of the access point 100. The camera 130 is, for example, a video camera that records video of the point of view of the camera 130. The camera 130 captures one or more images of actions performed by a first person trying to access the facility through the access point 100. The camera 130 detects the actions performed by the person for a predetermined time period after entering the field of view of the camera 130.

The method 400 also includes determining, using the electronic processor 210, based on credential information whether the first person is authorized to enter through the access point 100 (at block 420). In some embodiments, the access control sensor 140 is configured to receive the credential information from the first person. For example, the access control sensor 140 is a radio frequency identity (RFID) sensor and receives credential information from a key card of the first person including an RFID tag. The access control sensor 140 may include a biometric sensor configured to capture biometric information of the first person. For example, the access control sensor 140 scans a fingerprint, a retina, or the like of the first person. The electronic processor 210 determines the credential information based on the biometric information of the first person. In some embodiments, the credential information may be determined based on performing facial recognition analysis on the one or more images. Specifically, the electronic processor 210 executes the facial recognition application 250 on the one or more images to determine an identity of the first person. The electronic processor 210 executes the credential application 260 to determine the credential information based on the information obtained from the camera 130 and/or the access control sensor 140. The credential information may include, for example, an identity of the first person and whether the first person is allowed to access the facility through the access point 100. The memory 220 may store a database storing credential information corresponding with whether the person having the credential information is authorized to enter through the entryway 110.

In response to determining that the first person is authorized to enter through the access point 100, the method 400 includes detecting, based on the one or more images, one or more persons between the first person and the barrier 120 of the access point 100 (at block 430). In one example, the electronic processor 210 analyzes the one or more images to determine whether one or more persons are present between the first person and the barrier 120. The electronic processor 210 may execute a different application to analyze the one or more images and determine the one or more persons.

In response to determining that the first person is authorized to enter through the access point 100, the method 400 also includes detecting a consent gesture of the first person in the one or more images (at block 440). The electronic processor 210 executes the gesture recognition application 270 to detect a consent gesture in the one or more images. In one example, the consent gesture is a waving hand of the first person. In some embodiments, different gestures may be used to indicate the consent by the first person. In some embodiments, the electronic processor 210 provides, using the feedback mechanism 160, a feedback when the consent gesture is detected. For example, the electronic processor 210 plays a sound over the speaker, activates a one or more LED indicators, displays text on a display to provide the feedback to the first person.

In response to determining that the first person is authorized to enter through the access point 100, the method 400 also includes controlling the barrier 120 to open the access point 100 when the consent gesture is detected (at block 450). For example, the electronic processor 210 controls the barrier 120 to open the access point 100 when the consent gesture is detected. The electronic processor 210 controls the actuator 150 to unlock or open the barrier 120. The electronic processor 210 keeps the barrier 120 locked or closed when the consent gesture is not detected. The electronic processor 210 controls the actuator 150 to keep the barrier 120 locked or closed. The method 400 may also the electronic processor 210 generating the first alert, second alert, and other alerts and/or locking or closing the barrier 120 for the situations described above with respect to method 300.

The methods described herein provide, among other things, a way to distinguish between piggyback and tailgate and therefore to generate an alert when an unauthorized person is attempting to enter the facility through an access point.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (for example, comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

We claim:
1. An access control system comprising:
a camera configured to be positioned at an access point;
a feedback mechanism; and
an electronic processor coupled to the camera and the feedback mechanism, the electronic processor configured to
receive, from the camera, one or more images of a first person at the access point;
determine based on credential information whether the first person is authorized to enter through the access point;
in response to determining that the first person is authorized to enter through the access point, determine, based on an unprompted consent-to-follow gesture of the first person detected in the one or more images, a number of guests of the first person requested to enter through the access point;
determine, based on the one or more images, a number of persons entering through the access point;
provide, using the feedback mechanism, a feedback indicating the number of guests determined based on the consent-to-follow gesture; and
generate an alert indicating unauthorized entry when the number of persons is greater than the number of guests.

2. The access control system of claim 1, wherein the access point includes a barrier and the electronic processor is further configured to
control the barrier to open the access point when the number of persons is less than or equal to the number of guests.

3. The access control system of claim 1, wherein the electronic processor is further configured to
determine a number of allowed guests for the first person; and
generate a second alert indicating excess guests when the number of guests is greater than the number of allowed guests.

4. The access control system of claim 1, further comprising:
an access control sensor configured to receive the credential information from the first person.

5. The access control system of claim 1, wherein the electronic processor is further configured to
determine the credential information based on performing facial recognition analysis on the one or more images.

6. The access control system of claim 1, further comprising a biometric sensor configured to capture biometric information of the first person, wherein the electronic processor is further configured to determine the credential information based on the biometric information of the first person.

7. The access control system of claim 1, wherein the consent-to-follow gesture is a raised hand indicating the number of guests with fingers of the raised hand.

8. A method for providing access control comprising:
receiving, from a camera positioned at an access point, one or more images of a first person at the access point;
determining, using an electronic processor, based on credential information whether the first person is authorized to enter through the access point;

in response to determining that the first person is authorized to enter through the access point, determining, using the electronic processor based on an unprompted consent-to-follow gesture of the first person detected in the one or more images, a number of guests of the first person requested to enter through the access point;

determining, using the electronic processor based on the one or more images, a number of persons entering through the access point;

providing, using a feedback mechanism, a feedback indicating the number of guests determined based on the consent-to-follow gesture; and generating, using the electronic processor, an alert indicating unauthorized entry when the number of persons is greater than the number of guests.

9. The method of claim 8, further comprising:
controlling a barrier of the access point to open the access point when the number of persons is less than or equal to the number of guests.

10. The method of claim 8, further comprising:
determining a number of allowed guests for the first person; and
generating a second alert indicating excess guests when the number of guests is greater than the number of allowed guests.

11. The method of claim 8, further comprising:
determining the credential information based on performing facial recognition analysis on the one or more images.

12. The method of claim 8, further comprising:
capturing, using a biometric sensor, biometric information of the first person; and
determining the credential information based on the biometric information of the first person.

13. The method of claim 8, wherein the consent-to-follow gesture is a raised hand indicating the number of guests with fingers of the raised hand.

* * * * *